United States Patent [19]

Tomkin

[11] 4,051,733
[45] Oct. 4, 1977

[54] WHEEL BALANCING INSTRUMENT

[76] Inventor: Sam Tomkin, Box 482 Cantrell Ave., Middletown, N.Y. 10940

[21] Appl. No.: 735,142

[22] Filed: Oct. 26, 1976

[51] Int. Cl.² .......................................... G01M 1/12
[52] U.S. Cl. ...................................... 73/484; 73/486
[58] Field of Search .................. 73/483, 484, 485, 486

[56] References Cited

U.S. PATENT DOCUMENTS

| 2,461,591 | 2/1949 | Currier | 73/484 |
| 2,919,582 | 1/1960 | Riedel | 73/484 |
| 3,992,950 | 1/1976 | Pflieger | 73/486 |

Primary Examiner—James J. Gill
Attorney, Agent, or Firm—Jack D. Slobod

[57] ABSTRACT

A pendently suspended instrument for indicating the balance condition of a generally horizontal centrally apertured wheel includes a wheel support member having an upwardly facing surface for engaging the bottom side of the wheel. An elongated tube extends upward from the surface and a line is trained through the tube and secured to a member threaded in the center of the tire support member and tube for enabling vertical adjustment of the effective point of attachment of the line to the wheel support member. The upper end of the line is configured for attachment to an elevated support. A spring loaded wheel centering element, of upwardly converging shape, is carried slideably at the center of the wheel support member. The upwardly converging shape is produced by a plurality of angularly spaced apart triangular blades projecting upward from the wheel centering element and passing slideably through radially elongated slots in the wheel support member.

2 Claims, 5 Drawing Figures

WHEEL BALANCING INSTRUMENT

FIELD OF THE INVENTION

The present invention relates generally to pendently suspended instruments for carrying a wheel and indicating the balance condition of the wheel. In its particular aspects, the present invention relates to a wheel balancing instrument of the suspended type which includes a spring-loaded sliding member of upwardly converging shape for centering the wheel on the instrument.

BACKGROUND OF THE INVENTION

In prior art wheel balancing instruments of the suspended type, it has been a time consuming operation to mount the wheel thereon in centered relationship, since the manual adjustment of parts has been necessary. Thus, in U.S. Pat. Nos. 2,481,256 to Sutton and 2,512,231 to Hart, wherein oppositely facing wheel center engaging parts are provided threadably mounted on a central shaft, it is necessary to manually move these parts to tightly grip the wheel center. Also, in U.S. Pat. No. 3,452,605 to Markley, where a conical member is provided for insertion through the center of a wheel, it is necessary to adjust a plurality of wheel supporting nuts mounted on the conical member.

Further, since prior art wheel balancing instruments have not had a feature permitting sensitivity adjustment during the balancing operation, there has been a tendency for parts of the instrument to be initially subject to high deforming stresses.

OBJECTS OF THE INVENTION

It is an object of the present invention to provide a wheel balancing instrument of the suspended type with spring loaded means for automatically centering the wheel on the instrument.

It is a further object of the present invention to provide a wheel balancing instrument of the suspended type with means for easily adjusting the sensitivity of the instrument to wheel unbalance.

SUMMARY OF THE INVENTION

Briefly, the aforementioned and other objects of the present invention are satisfied by providing a pendently suspended instrument for indicating the balance condition of a centrally apertured generally horizontal wheel. The instrument includes a wheel support member having a generally circularly symmetric upwardly facing surface for generally concentrically engaging the bottom side of the wheel. An elongated generally tubular member extends upward concentrically from the surface and a flexible support line is trained through the tubular member. The upper end of the line is attached to an elevated support above the instrument while the lower end of the line is secured to a moveable member that is threadably engaged in the center of the tire support member and tubular member. As the moveable member is threadably rotated, the effective point of attachment of the lower end of the line to the wheel support member is moved generally vertically. This point of attachment generally lies above the center of gravity of the wheel.

As the point of attachment is raised above the center of gravity of the wheel, the sensitivity of the instrument is decreased and vice versa. An initial decreased sensitivity is desireable to prevent the elongated tube from being bent by the line bearing on the upper end thereof. As the wheel is brought into balance, the instrument is preferably adjusted for increased sensitivity.

For centering the wheel on the wheel support member, a generally vertically moveable wheel centering member of upwardly converging shape is provided for engaging the inside diameter of the wheel. This wheel centering member is carried slideably about the tubular member and is spring loaded for urging the wheel centering member upward.

The wheel centering member includes a plurality of angularly spaced apart upwardly directed triangular blades whose upper edges form the aforementioned upwardly converging shape. The blades pass slideably through angularly elongated guide apertures in the wheel support member. Further, the instrument includes a downwardly directed tubular portion having longitudinally directed angularly spaced apart guide slots into which the blades slideably extend.

Other objects, features and advantages of the present invention will become apparent upon perusal of the following detailed description of the preferred embodiment thereof when taken in conjunction with the appended drawing wherein:

DETAILED DESCRIPTION OF THE PREFERRED EMBODIMENT

Figure 1:
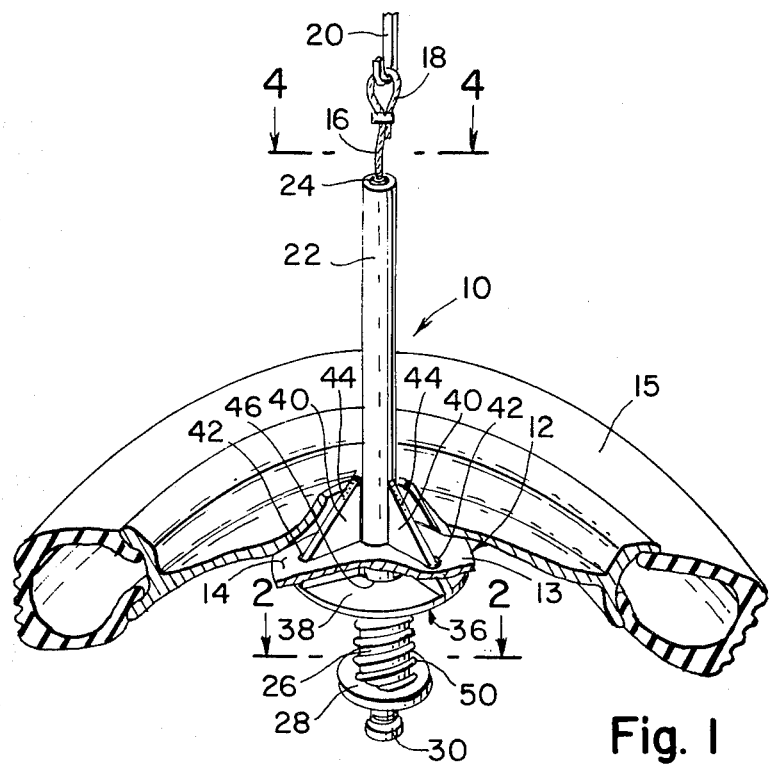
FIG. 1 is a generally elevational, partially broken away, pictorial presentation of the wheel balancing instrument of the present invention with a wheel carried thereon.
Figure 2:
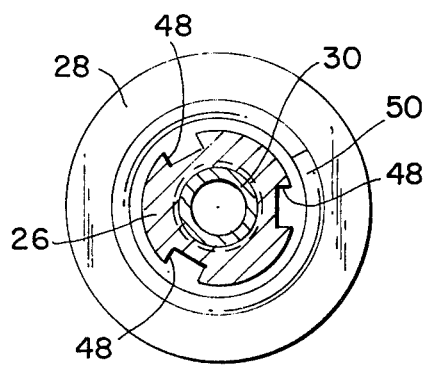
FIG. 2 is a transverse cross-sectional view of the wheel balancing instrument taken through the lines 2—2 in FIG. 1.
Figure 3:
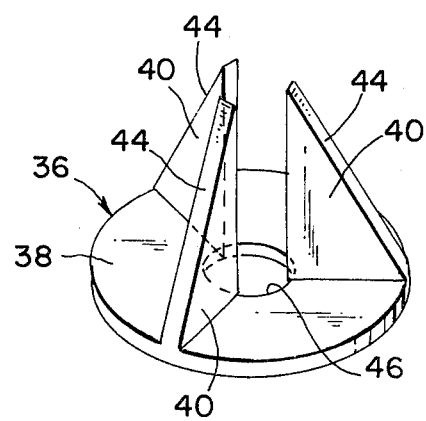
FIG. 3 is a pictorial presentation of a moveable part of the wheel balancing instrument in FIG. 1.
Figure 4:
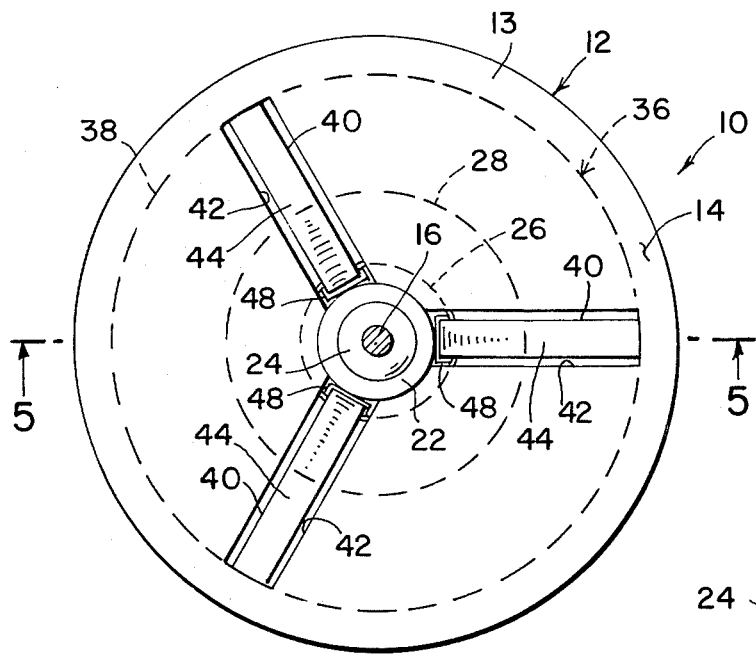
FIG. 4 is a cross-sectional top view of the wheel balancing instrument taken through the lines 4—4 in FIG. 1 after removal of the wheel.

With reference to FIGS. 1 through 5, the wheel balancing instrument 10 of the present invention comprises a wheel support member 12 which includes a flange 13 having a generally circularly symmetric upwardly facing flat surface 14 for generally concentrically engaging the bottom side of a wheel 15. The flange 13 is press fitted onto the wheel support member. Wheel support member 12 is suspended via an elongated flexible line 16 that has a loop 18 at its upper end for engaging a fixedly elevated hook 20 or other suitable support. An elongated tube 22 extends upward fixedly and coaxially from surface 14 of wheel support member 12. The line 16 passes through tube 22 and, as should now be apparent, line 16 will be concentric with the upper end of the tube providing the wheel 15 is both balanced and properly centered on support member 12. In a condition of unbalance, the support member 12 and wheel 15 tilt resulting in the line 16 not being concentric with the upper end of the tube 22. In an extreme case of wheel unbalance the line 16 will actually engage the upper end of the tube exerting a transverse force thereon. To aid in guaging by eye whether the line 16 is concentric with the upper end of tube 22, a disc 24 is frictionally carried by line 16 just above tube 22.

Figure 5:
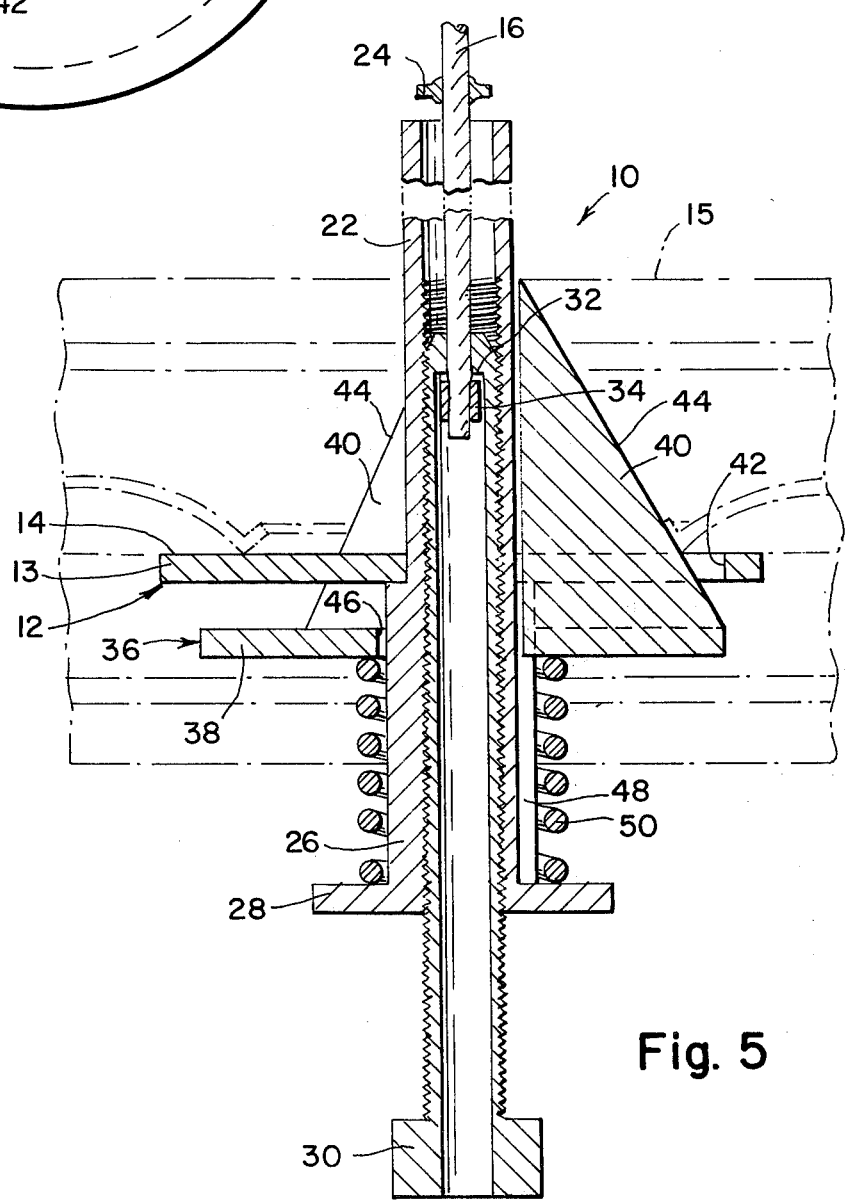
FIG. 5 is an elevational cross-sectional view of the wheel balancing instrument taken through the lines 5—5 in FIG. 4.

The wheel support member also includes a tubular portion 26 which extends downward fixedly from flange 13. Portion 26 is coaxial with tube 22 and has the same inside diameter as the tube and a larger outside diameter. A circular flange 28 is provided at the bottom end of tubular portion 26 and an elongated tubular bolt 30 is threadably engaged in the inside diameter of portion 26 and in the inside diameter of tube 22. As best shown in FIG. 5, the lower end of line 16 is captured in the interior of the bolt 30 by means of a re-entrant portion 32 of bolt 30 formed at its upper end which rotatably engages a ferrule 34 crimped onto the line. As the bolt 30 is rotated the effective point of attachment of the lower end of line 16 to wheel suppport member 12 moves vertically relative to member 12. This point, which is defined by the upper end of bolt 30, is generally positioned to lie proximate the top side of wheel 15. As this point is raised relative to the wheel support member 12, the sensitivity of the instrument 10 is decreased. This means that when the member 12 tilts in response to unbalance of wheel 15, the angle between the upper end of line 16 and the axis of the tube 22 decrease. In response to lowering of this point, this angle increases resulting in increased sensitivity. As should be apparent, to avoid inordinate stress exerted on the upper end of tube 22 by line 16 when wheel 15 is initially placed on instrument 10, the sensitivity should be set relatively low by screwing bolt 30 all the way into tubular portion 26. As the wheel 15 is brought into balance by adding weights to wheel 15 in the conventional manner, the bolt 30 should be screwed out of tubular portion 26 for increased sensitivity.

In order to accurately balance wheel 15, it is essential that the wheel is centrally carried by wheel support member 12. To this end, a vertically moveable wheel centering member 36 of upwardly converging shape is provided for engaging the inside diameter of wheel 15. Wheel centering member 36 includes an annular flange 38 which is slideably received concentrically about tubular portion 26 below flange 13. Three upwardly and radially directed blades 40, each in the shape of a right triangle, extend upward fixedly from flange 38 in equiangularly spaced apart relationship. Blades 40 pass slideably through radially elongated guide apertures 42 in flange 13. The blades 40 engage the inside diameter of wheel 15 with their outwardly facing upwardly converging edges 44.

The wheel centering member 36, in addition to be guided by the sliding fit of the blades 40 in apertures 42, is also guided in two other ways by configuring the blades to extend radially inward beyond the inside diameter 46 of flange 38. Thus, the blades 40 also slideably engage tube 22 along their vertical edges and extend slideably into longitudinally directed angularly spaced apart slots or grooves 48 in tubular portion 26.

The wheel centering member 36 is urged upward into engagement with wheel 15 by means of a helical compression spring 50 disposed about portion 26 and acting between flanges 28 and 38. It will now be appreciated that when wheel 15 is placed on wheel support member 12, the force of spring 50 will automatically seat the wheel in centered relationship on wheel support member 12.

While the preferred embodiment of the present invention has been described herein in particular detail, it should be noted that numerous modifications, additions and omissions in the details thereof are possible within the intended spirit and scope of the invention. Accordingly, the following claims define the invention.

I claim:

1. An instrument for indicating the balance condition of a centrally apertured wheel; said instrument being adapted to be pendently suspended from an elevated support and being adapted to carry said wheel in a generally horizontal orientation; said instrument comprising: wheel support means having a generally circularly symmetric upwardly facing surface for generally concentrically engaging a bottom side of said wheel; the top surface of said wheel support means being formed by a generally planar member having a plurality of radially directed elongated apertures therethrough; and elongated generally tubular member extending upwardly fixedly and concentrically from said surface for passage through the center of said wheel; a flexible line means for passage through said generally tubular member; said line means having an upper end for connection to said elevated support; means carried by the center of said wheel support means for engaging a lower end of said line means; centrally apertured upwardly converging means for engaging the center of said wheel; said wheel center engaging means being carried concentrically by said wheel support means for vertical movement along said tubular member; said wheel center engaging means comprising a plurality of vertically and radially oriented angularly spaced apart triangular blades which are slideable respectively through said plurality of apertures; said wheel support means having a generally circular elongated portion projecting downward fixedly from said generally planar member coaxially with said tubular member; spring means disposed about said portion and acting against said wheel center engaging means for urging said center engaging means upward; said portion having a plurality of longitudinally directed angularly spaced apart slots formed therein respectively in line with said radially elongated apertures; said plurality of blades extending radially inward for sliding movement in said slots; wherein a condition of concentricity between said line means and an upper end of said tubular member indicates a condition of balance of said wheel.

2. The instrument of claim 1 wherein said line engaging means is threadably engaged in the center of said wheel support means and in said tubular member for adjustable vertical movement relative to said wheel support means for enabling a point of engagement of the lower end of said line means to be adjusted vertically relative to said wheel support means.

* * * * *